United States Patent
Jarvo et al.

(10) Patent No.: US 11,713,723 B2
(45) Date of Patent: Aug. 1, 2023

(54) METHOD AND SYSTEM FOR OPERATING AN ENGINE

(71) Applicant: PRATT & WHITNEY CANADA CORP., Longueuil (CA)

(72) Inventors: James Jarvo, Saint-Bruno (CA); Patrick Manoukian, Saint-Laurent (CA); Philippe Beauchesne-Martel, Brossard (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 1099 days.

(21) Appl. No.: 16/425,488

(22) Filed: May 29, 2019

(65) Prior Publication Data
US 2020/0362769 A1 Nov. 19, 2020

Related U.S. Application Data

(60) Provisional application No. 62/848,146, filed on May 15, 2019.

(51) Int. Cl.
*F02C 9/28* (2006.01)
*F02C 7/22* (2006.01)

(52) U.S. Cl.
CPC ............... *F02C 9/28* (2013.01); *F02C 7/222* (2013.01); *F05D 2220/32* (2013.01); *F05D 2270/3032* (2013.01)

(58) Field of Classification Search
CPC .......... F02C 7/222; F02C 7/232; F02C 9/263; F02C 9/28; F23R 3/28; F23R 3/346
See application file for complete search history.

(56) References Cited

U.S. PATENT DOCUMENTS

| | | | |
|---|---|---|---|
| 3,834,160 A | 9/1974 | Moehring et al. | |
| 4,404,806 A | 9/1983 | Bell, III et al. | |
| 4,491,272 A | 1/1985 | Bradley et al. | |
| 5,243,816 A | 9/1993 | Huddas | |
| 5,277,023 A | 1/1994 | Bradley et al. | |
| 5,339,845 A | 8/1994 | Huddas | |
| 5,349,811 A | 9/1994 | Stickler et al. | |
| 5,402,634 A | 4/1995 | Marshall | |
| 5,406,798 A | 4/1995 | Wiesner, Jr. | |
| 5,694,764 A | 12/1997 | Blain et al. | |
| 5,735,117 A * | 4/1998 | Toelle | F02C 7/232 60/740 |

(Continued)

FOREIGN PATENT DOCUMENTS

| CN | 105716119 | 6/2016 |
|---|---|---|
| CN | 105823087 | 8/2016 |

(Continued)

*Primary Examiner* — Arun Goyal
(74) *Attorney, Agent, or Firm* — Norton Rose Fulbright Canada LLP

(57) ABSTRACT

Systems and methods for operating an engine are described herein. The engine is operated at low power by supplying fuel to a combustor through a first set of fuel nozzles of at least one first manifold and without supplying fuel to the combustor through a second set of fuel nozzles of at least one second manifold. An amount of fuel to at least in part fill the at least one second manifold to impede fuel coking of the second set of fuel nozzles is determined. The amount of fuel is periodically supplied to the at least one second manifold.

20 Claims, 6 Drawing Sheets

(56) References Cited

U.S. PATENT DOCUMENTS

| | | |
|---|---|---|
| 5,799,872 A | 9/1998 | Nesbitt et al. |
| 5,809,771 A | 9/1998 | Wernberg |
| 5,899,073 A | 5/1999 | Akimaru |
| 6,125,624 A | 10/2000 | Prociw |
| 6,463,741 B1 * | 10/2002 | Frutschi .................. F02C 6/003 60/39.12 |
| 6,619,025 B2 | 9/2003 | Wernberg |
| 7,003,939 B1 | 2/2006 | Rackwitz et al. |
| 8,122,720 B2 | 2/2012 | Miyake |
| 8,991,186 B2 | 3/2015 | Griffiths et al. |
| 9,103,284 B2 | 8/2015 | Erickson et al. |
| 9,267,439 B2 | 2/2016 | Corson et al. |
| 9,303,562 B2 | 4/2016 | Codron et al. |
| 9,382,850 B2 | 7/2016 | Menon et al. |
| 9,404,423 B2 | 8/2016 | Griffiths et al. |
| 9,404,424 B2 | 8/2016 | Morawski et al. |
| 9,581,088 B2 | 2/2017 | Qin et al. |
| 9,683,744 B2 | 6/2017 | Patel et al. |
| 9,863,267 B2 | 1/2018 | O'Dea et al. |
| 9,863,322 B2 | 1/2018 | Williams et al. |
| 10,233,846 B2 | 3/2019 | Zhang et al. |
| 10,400,674 B2 | 9/2019 | Xu |
| 10,408,131 B2 | 9/2019 | Thompson et al. |
| 10,451,509 B2 | 10/2019 | Mehrer et al. |
| 10,465,908 B2 | 11/2019 | Stevenson et al. |
| 10,465,909 B2 | 11/2019 | Boardman et al. |
| 10,539,073 B2 | 1/2020 | Richards, Jr. |
| 2010/0031670 A1 * | 2/2010 | Hoffman ................. F01D 15/10 307/151 |
| 2013/0042920 A1 | 2/2013 | Snodgrass et al. |
| 2013/0061599 A1 | 3/2013 | Van Alen |
| 2013/0259088 A1 | 10/2013 | Bellis et al. |
| 2014/0000270 A1 * | 1/2014 | Dobbeling ................. F02C 3/04 60/726 |
| 2015/0027100 A1 | 1/2015 | Qin et al. |
| 2015/0292412 A1 | 10/2015 | Rodrigues |
| 2016/0201917 A1 | 7/2016 | Dautova et al. |
| 2016/0245524 A1 | 8/2016 | Hill |
| 2016/0273453 A1 | 9/2016 | Frish et al. |
| 2016/0273775 A1 * | 9/2016 | Griffiths .................. F23K 5/147 |
| 2017/0234229 A1 | 8/2017 | Ribarov et al. |
| 2017/0298840 A1 | 10/2017 | Doody |
| 2017/0306856 A1 | 10/2017 | Bickley |
| 2018/0163637 A1 | 6/2018 | Griffiths |
| 2018/0163966 A1 | 6/2018 | Jones et al. |
| 2018/0372321 A1 * | 12/2018 | Yates ...................... F23R 3/283 |
| 2018/0372323 A1 * | 12/2018 | Griffiths .................. F02C 9/34 |
| 2019/0063754 A1 | 2/2019 | Dudebout et al. |
| 2019/0101062 A1 | 4/2019 | Vise et al. |
| 2019/0271470 A1 | 9/2019 | Boardman et al. |
| 2019/0292996 A1 | 9/2019 | Hicks |

FOREIGN PATENT DOCUMENTS

| | | |
|---|---|---|
| CN | 109356725 | 2/2019 |
| GB | 888243 | 1/1962 |
| GB | 2523126 | 8/2015 |
| GB | 2572753 | 10/2019 |
| GB | 2572783 | 10/2019 |

* cited by examiner

METHOD AND SYSTEM FOR OPERATING AN ENGINE

CROSS-REFERENCE TO RELATED APPLICATIONS

The present application claims priority under 35 U.S.C. 119(e) of Provisional Patent Application bearing Ser. No. 62/848,146 filed on May 15, 2019, the contents of which are hereby incorporated by reference.

TECHNICAL FIELD

The present disclosure relates generally to engines, and, more particularly, to operating an engine.

BACKGROUND OF THE ART

For engines having a multistage fueling system, the engine may be operated by using one fuel stage and turning off the other fuel stage(s). However, stagnant fuel may be present in the fuel stage(s) not being used. This stagnant fuel may be exposed to high temperatures, which may lead to fuel coking in the unused fuel stage(s).

As such, there is a need for improvement.

SUMMARY

In one aspect, there is provided a method for operating an engine. The method comprises operating the engine at low power by supplying fuel to a combustor through a first set of fuel nozzles of at least one first manifold and without supplying fuel to the combustor through a second set of fuel nozzles of at least one second manifold, determining an amount of fuel to at least in part fill the at least one second manifold to impede fuel coking of the second set of fuel nozzles, and supplying the amount of fuel periodically to the at least one second manifold.

In one aspect, there is provided a system for operating an engine. The system comprises at least one processing unit and a non-transitory computer-readable memory having stored thereon program instructions. The program instructions are executable by the at least one processing unit for operating the engine at low power by supplying fuel to a combustor through a first set of fuel nozzles of at least one first manifold and without supplying fuel to the combustor through a second set of fuel nozzles of at least one second manifold, determining an amount of fuel to at least in part fill the at least one second manifold to impede fuel coking of the second set of fuel nozzles, and supplying the amount of fuel periodically to the at least one second manifold.

In once aspect, there is provided a computer readable medium having stored thereon program code executable by a processor for operating an engine. The program code comprises instructions for operating the engine at low power by supplying fuel to a combustor through a first set of fuel nozzles of at least one first manifold and without supplying fuel to the combustor through a second set of fuel nozzles of at least one second manifold, determining an amount of fuel to at least in part fill the at least one second manifold to impede fuel coking of the second set of fuel nozzles, and supplying the amount of fuel periodically to the at least one second manifold.

DESCRIPTION OF THE DRAWINGS

Reference is now made to the accompanying figures in which.

It will be noted that throughout the appended drawings, like features are identified by like reference numerals.

DETAILED DESCRIPTION

Figure 1:
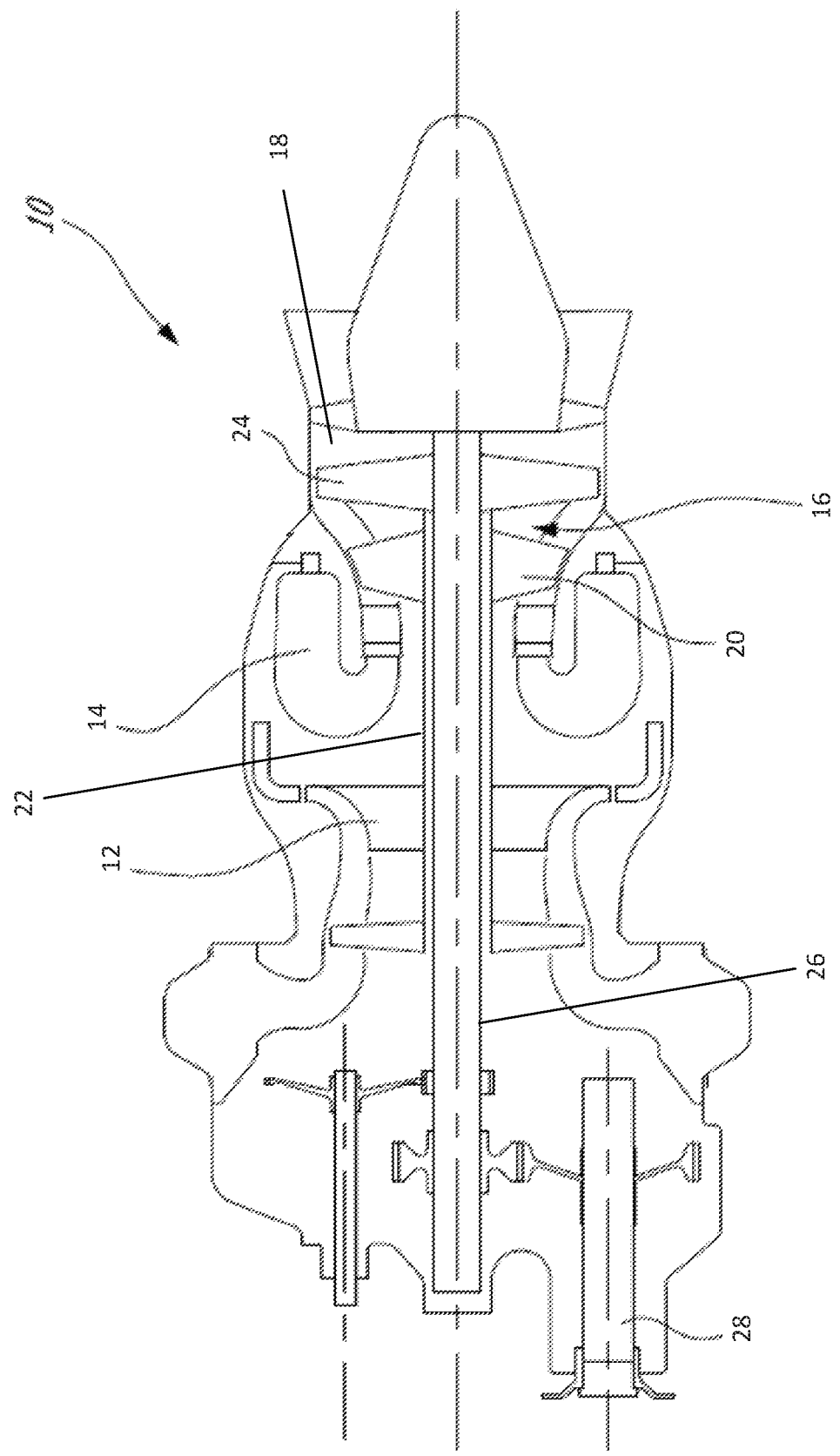
FIG. 1 is a schematic of an example gas turbine engine, in accordance with one or more embodiments.

FIG. 1 illustrates a gas turbine engine 10 of a type that may be provided for use in flight, generally comprising in serial flow communication a compressor section 12 for pressurizing the air, a combustor 14 in which the compressed air is mixed with fuel and ignited for generating an annular stream of hot combustion gases, and a turbine section 16 for extracting energy from the combustion gases. The fuel is provided to the combustor 14 through multiple fuel nozzles (not illustrated in FIG. 1) disposed about the combustor 14. Fuel is sprayed from the nozzles into the combustor 14, and the mixture of fuel and air is ignited for generating the annular stream of hot combustion gases. The combustion gases flowing out of the combustor 14 circulate through the turbine section 16 and are expelled through an exhaust duct 18. The turbine section 16 includes a compressor turbine 20 in driving engagement with the compressor section 12 through a high pressure shaft 22, and a power turbine 24 in driving engagement with a power shaft 26. The power shaft 26 is in driving engagement with an output shaft 28 through a reduction gearbox (not illustrated). It should be understood that while the engine 10 is a turboshaft engine, the methods and systems described herein may be applicable to any other type of gas turbine engine, such as a turbofan, turboprop, or any other suitable aircraft or industrial engine.

Figure 2A:
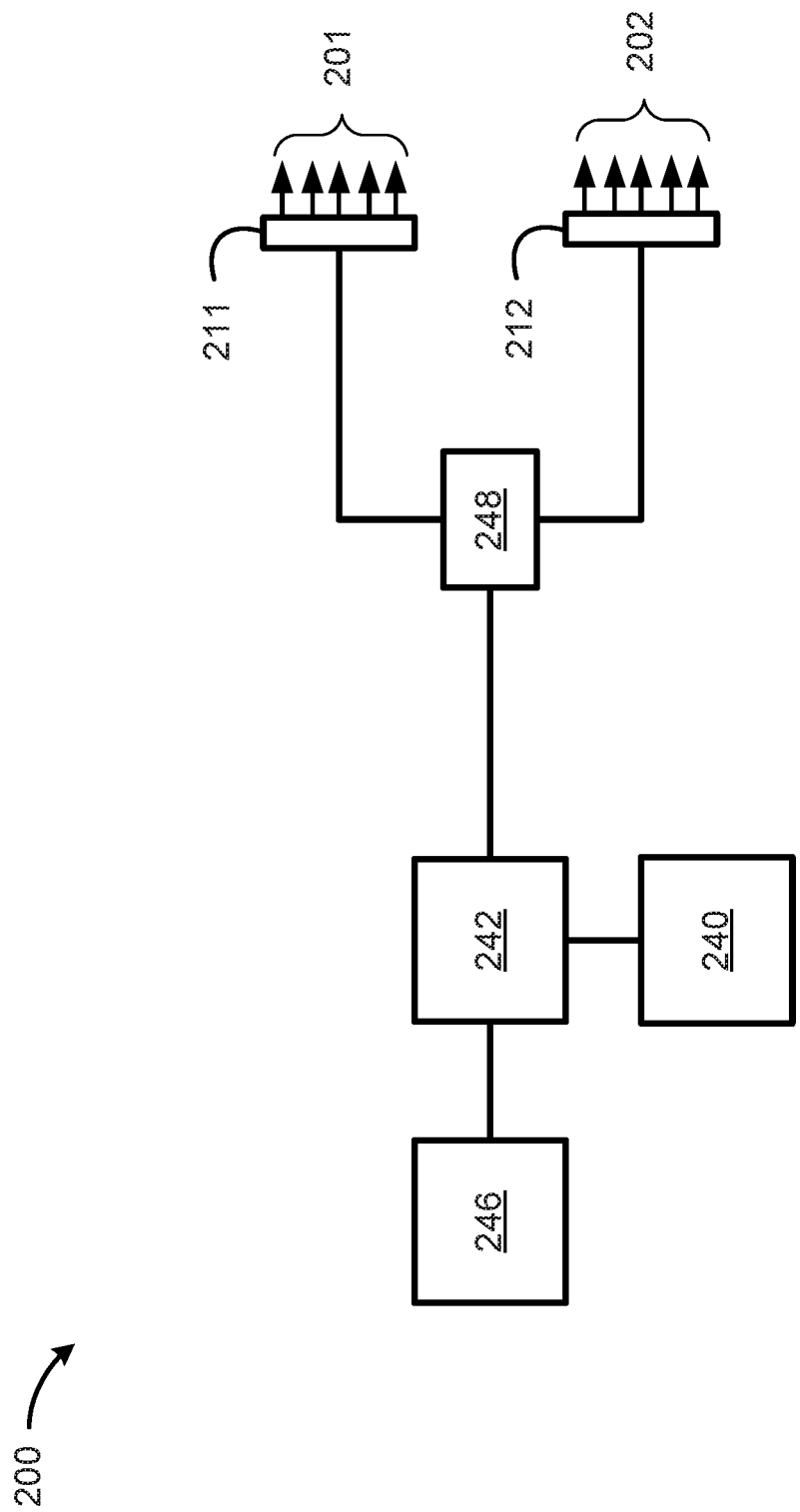
FIG. 2A is a schematic diagram illustrating an example fuel supply system for supplying fuel to an engine, in accordance with one or more embodiments.

FIG. 2A illustrates a fuel supply system 200 for supplying fuel to the combustor 14. In this illustrated embodiment, a first set of fuel nozzles 201 of at least one first manifold 211 supplies fuel to the combustor 14 during operation of the engine 10, and a second set of fuel nozzles 202 of at least one second manifold 212 may be used to supply fuel to the combustor 14 depending on the operation of the engine 10. An electronic controller 240 controls a fuel pump 242 to supply fuel from a reservoir 246 to the manifolds 211, 212 through one or more fuel lines. More specifically, the fuel pump 242 generates pressure to accordingly supply the fuel. The fuel pump 242 provides the fuel to a fuel flow divider 248, which is operably connected to the manifolds 211, 212, to accordingly supply fuel to manifolds 211, 212. The engine 10 may be operated at low power by supplying fuel to the combustor 14 through the first set of fuel nozzles 201 of the first manifold 211 and without supplying fuel to the combustor 14 through the second set of fuel nozzles 202 of the second manifold 212. While the fuel supply system 200 is described herein as having two manifolds and two sets of nozzles, the fuel supply system 200 can include any number of manifolds and sets of nozzles. For example, a given set of nozzles may have two or more manifolds that supply fuel thereto.

When the second set of fuel nozzles 202 is not in use, residual fuel may remain in the second manifold 212 and in and/or at the tips of the nozzles 202. Furthermore, the nozzles 202, and possibly at least part of the second manifold 212, can heat up to high temperatures when they are not in use. If the fuel is allowed to heat up beyond a coking temperature, coke can begin to buildup in the fuel, at the tip and/or on the walls of the nozzles 202 and/or in the manifold 212. The coking temperature refers to the temperature at which fuel begins to coke. By way of a specific and non-limiting example, the coking temperature of fuel used in aircraft engines may be approximately 400° F. The coking temperature varies depending on the fuel used. If the nozzles 202 are allowed to exceed the coking temperature, the coke particulates can build up and clog the nozzles 202, reducing the nozzles' effectiveness, or completely blocking fuel from passing through the nozzles 202. When coke particulates are formed within the nozzles 202, the nozzles 202 would typically be cleaned out or replaced. The cleaning and replacement process can be tedious and costly. To impede fuel coking, an amount of fuel is periodically provided to the second manifold 212 to cause the second set of fuel nozzles 202 to supply fuel to the combustor 14, as is further described herein.

The controller 240 determines an amount of fuel to at least in part fill the second manifold 202 to impede fuel coking when the second set of fuel nozzles 202 are not in use. The controller 240 controls the fuel pump 242 to cause the amount of fuel to be periodically supplied to the second manifold 212 to impede fuel coking. Periodically supplying the amount of fuel to the second manifold 212 causes a flow of fresh fuel to the second set of fuel nozzles 202 and the second manifold 212 to clear any residual fuel gathered in the second manifold 212 and/or at the nozzles 202.

In some embodiments, the fuel flow divider 248 is a hydraulic flow divider valve. When the fuel pump 242 generates pressure less than an amount to maintain flow in the second manifold 212, the hydraulic flow divider valve cuts off the fuel to the second manifold 212. That is, the hydraulic flow divider valve has a cracking pressure below which the hydraulic flow divider valve cuts off fuel to the second manifold 212. The cracking pressure is a minimum pressure for the hydraulic flow divider valve to operably provide fuel flow to the second manifold 212. The amount of fuel periodically supplied to the second manifold 212 may be provided at a pressure above the cracking pressure of the hydraulic flow divider valve in order to provide the amount of fuel to the second manifold 212.

In some embodiments, the fuel flow divider 248 is a solenoid actuated flow divider valve. The controller 240 may be communicatively connected to the solenoid actuated flow divider valve to actuate a solenoid of the solenoid actuated flow divider valve to cause fuel to be provided to the second manifold 212. The controller 240 may synchronize the control of the fuel pump 242 (to provide the additional amount of fuel) and the actuation of the solenoid actuated flow divider valve.

Figure 2B:
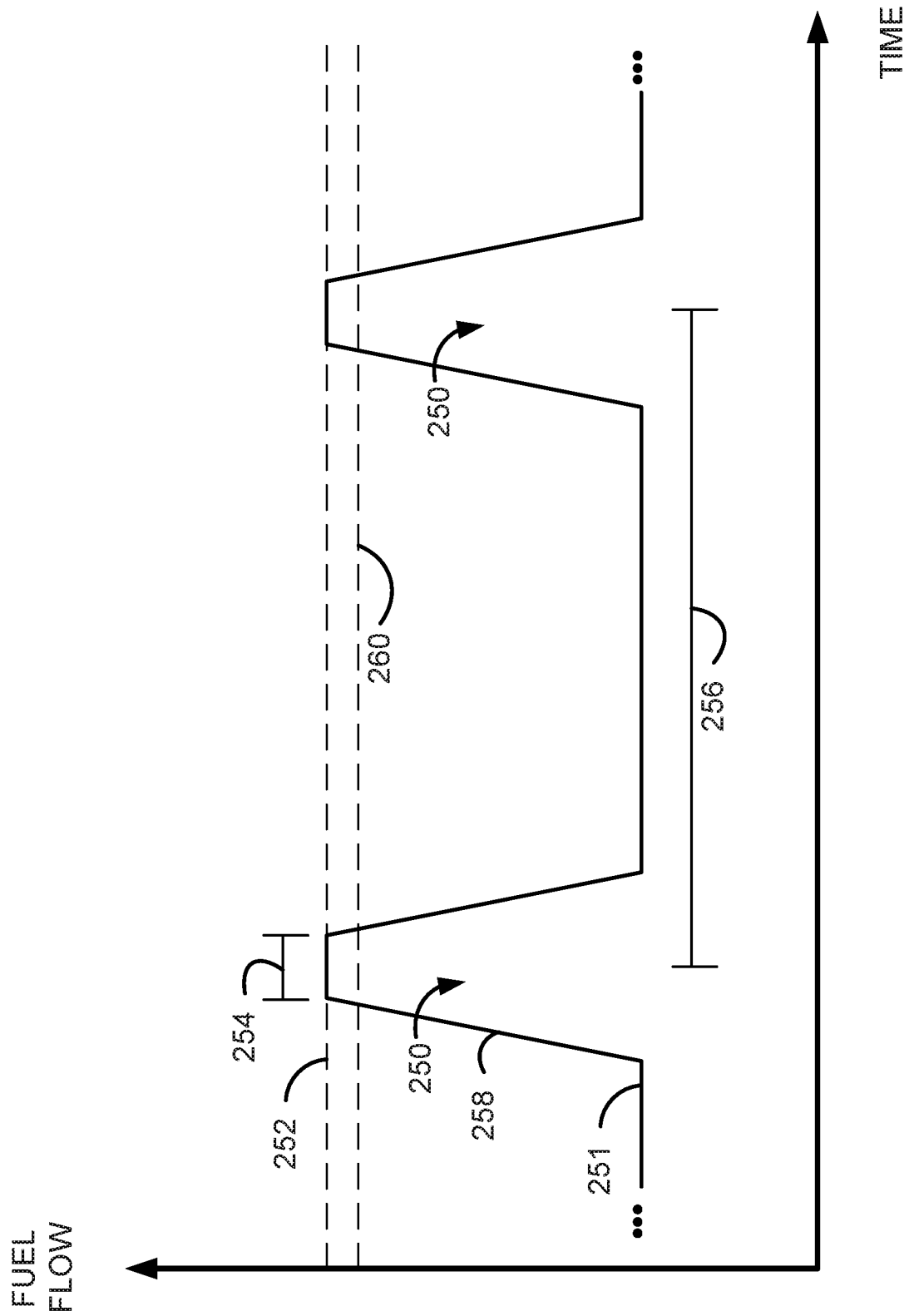
FIG. 2B is a signal diagram illustrating the supply of fuel, in accordance with one or more embodiments.

With reference to FIG. 2B, a signal diagram illustrates the control of fuel flow supplied from the fuel pump 242. As illustrated, the fuel flow is supplied at a first value 251 to operate the engine 10 at low power. When the fuel flow is supplied at the first value 251, fuel is supplied to the first set of fuel nozzles 201 and without any fuel being supplied to the second set of fuel nozzles, as the fuel pressure is less than an amount which would cause the fuel flow divider 248 to provide fuel to the second manifold 212. An additional amount of fuel 250 is periodically supplied to replenish the second manifold 202 to cause the second set of fuel nozzles 202 to supply fuel to the combustor 14. The additional amount of fuel 250 is supplied to cause the fuel flow to be provided at a second value 252 for a duration 254. The duration may be set at any suitable time period such that the cracking pressure 260 is exceeded for a sufficient period of time to clear any residual fuel in the second manifold 212 and at the second set of nozzles 202. The duration may be determined to fill the second manifold 212. The amount of fuel 250 is periodically supplied at a time interval 256. The time interval is set such that it is shorter than an amount of time that it would take for residual fuel in the second manifold 212 and/or at the second set of nozzles 202 to reach the coking temperature. The rate 258 at which the fuel flow is increased from the first value 251 to the second value 252 may be set at any suitable value. The rate 258 may be set to prevent the engine 10 from surging.

The controller 240 may determine the amount of fuel 250, the first value 251, the second value 252, the duration 254, the interval 256 and/or the rate 258. In some embodiments, one or more of the amount of fuel 250, the first value 251, the second value 252, the duration 254, the interval 256 and the rate 258 may be predetermined values that are obtained by the controller 240. In some embodiments, one or more of the amount of fuel 250, the first value 251, the second value 252, the duration 254, the interval 256 and the rate 258 may be calculated by the controller 240.

In some embodiments, the engine 10 comprises more than two manifolds, where each manifold is associated with a set of fuel nozzles. For example, the engine 10 may comprise three manifolds, four manifolds, five manifolds, and so forth. The engine 10 may be operated with one or more primary manifolds being used to supply fuel to the combustor 14 and with one or more secondary manifolds not being used to supply fuel to the combustor 14. The amount of fuel may be determined to replenish the secondary manifold(s) and supplied periodically to the secondary manifold(s) to impede fuel coking.

Figure 3:
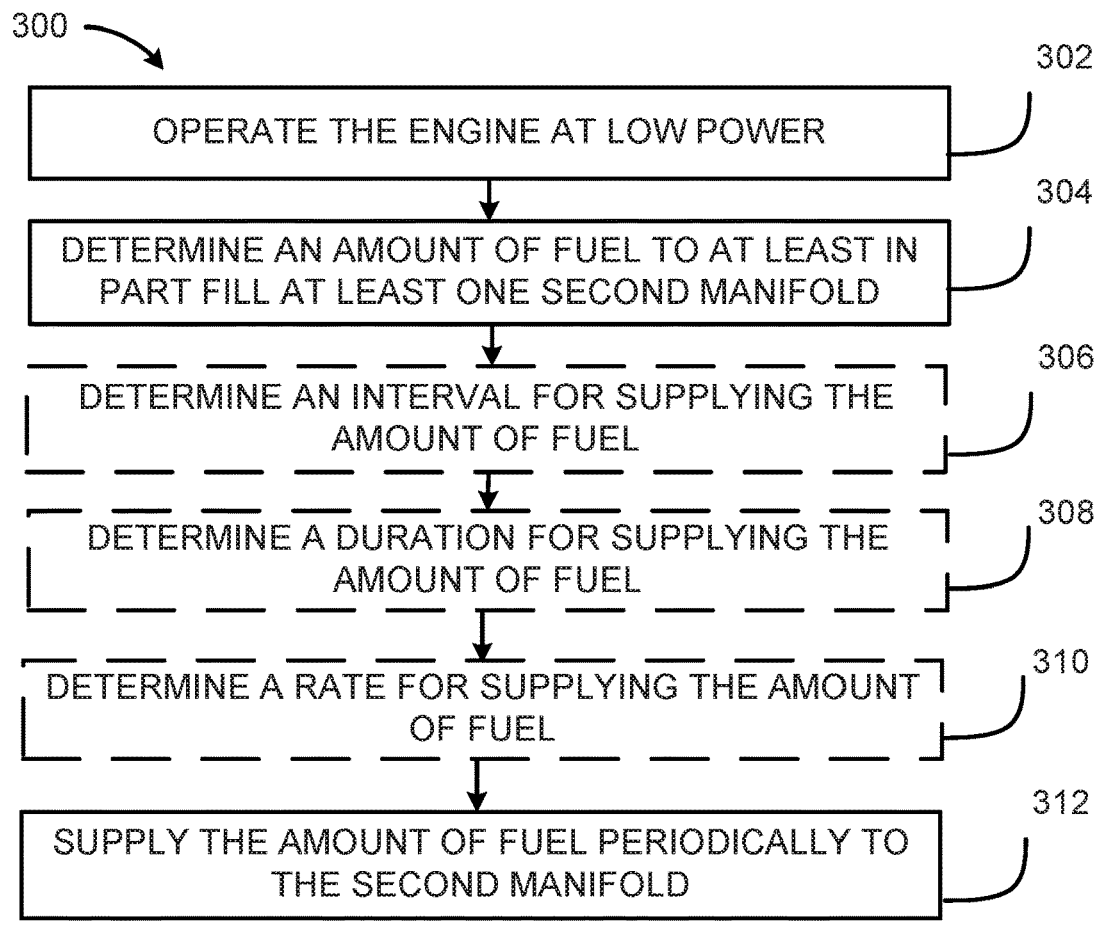
FIG. 3 is a flowchart of an example method for operating an engine, in accordance with one or more embodiments.

With reference to FIG. 3, there is illustrated a flowchart of a method 300 for operating an engine, such as the engine 10. At step 302, the engine 10 is operated at low power by supplying fuel to the combustor 14 through a first set of fuel nozzles 201 of at least one first manifold 211 and without supplying fuel to the combustor 14 through a second set of fuel nozzles 202 of at least one second manifold 212. At step 304, an amount of fuel 250 to at least in part fill the at least one second manifold 212 to impede fuel coking of the second set of fuel nozzles 202 is determined. The at least one second manifold 212 may be filled partially or completely. At step 312, the amount of fuel 250 is periodically supplied to the at least one second manifold 212 to impede fuel coking of the second set of fuel nozzles 202.

In some embodiments, the method 300 comprises, at step 306, determining a time interval 256 for supplying the amount of fuel 250 periodically to the at least one second manifold. Determining the time interval 256 may comprises determining an amount of time for residual fuel at the second set of fuel nozzles 202 of the at least one second manifold 212 to reach the coking temperature and setting the time interval 256 at less than this amount of time.

In some embodiments, the method 300 comprises, at step 308, determining a duration 254 for supplying the amount of fuel 250 to the at least one second manifold 212 to refill the at least one second manifold 212.

In some embodiments, the method 300 comprises, at step 310, determining a rate 258 for supplying the amount of fuel 250 to the at least one second manifold 212 to prevent the engine 10 from surging.

In some embodiments, step 312 comprises increasing fuel pressure of the fuel supplied to the hydraulic flow divider valve above the cracking pressure. The hydraulic flow divider valve is operatively connected to the at least one first manifold 211 and the at least one second manifold 212, and the hydraulic flow divider valve diverting the amount of fuel to the at least one second manifold 212.

In some embodiments, step 312 comprises actuating the solenoid of solenoid actuated flow divider valve. The solenoid actuated flow divider valve operatively connected to the at least one first manifold 211 and the at least one second manifold 212, the solenoid when actuated causing the solenoid actuated flow divider valve to divert the amount of fuel to the at least one second manifold 212.

In some embodiments, one or more of the amount of fuel 250, the first value 251, the second value 252, the duration 254, the interval 256 and the rate 258 may be determined to prevent one or more components of the engine 10 from overheating. For instance, when the engine 10 runs at low power for an extended period of time, one or more components of the engine 10 from overheating. For example, the amount of time for one or more components of the engine 10 to overheat when the engine runs at low power may be determined and the interval 256 may be set at less than this amount of time.

In some embodiments, an indicator may be outputted to an aircraft computer for display on a display device, to indicate that the engine 10 is operated in a mode where the amount of fuel is periodically being provided to the second manifold 212 to prevent fuel coking.

Figure 4:
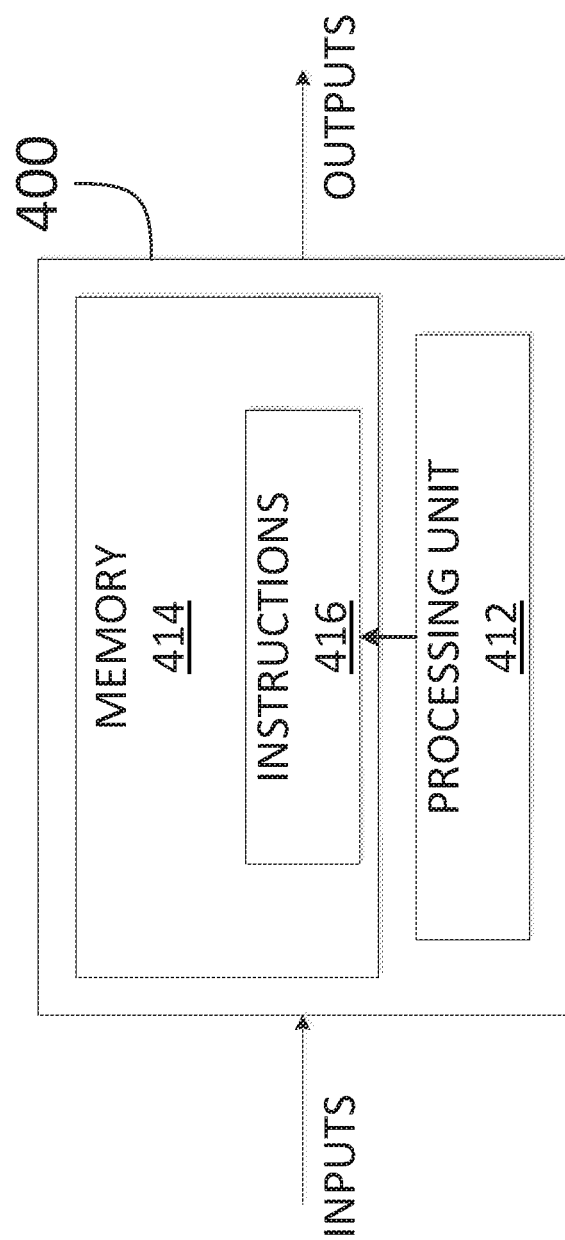
FIG. 4 is a block diagram of an example computing device for controlling an engine, in accordance with one or more embodiments.

With reference to FIG. 4, an example of a computing device 400 is illustrated. The controller 240 may be implemented with the computing device 400. Similarly, the method 300 may be implemented with the computing device 400. The computing device 400 comprises at least one processing unit 412 and at least one memory 414 which has stored therein computer-executable instructions 416. The processing unit 412 may comprise any suitable devices configured to implement the method 300 such that instructions 416, when executed by the computing device 400 or other programmable apparatus, may cause the functions/acts/steps performed as part of the method 300 as described herein to be executed. The processing unit 412 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 414 may comprise any suitable known or other machine-readable storage medium. The memory 414 may comprise non-transitory computer readable storage medium, for example, but not limited to, an electronic, magnetic, optical, electromagnetic, infrared, or semiconductor system, apparatus, or device, or any suitable combination of the foregoing. The memory 414 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 414 may comprise any storage means (e.g., devices) suitable for retrievably storing machine-readable instructions 416 executable by processing unit 412. Note that the computing device 400 can be implemented as part of a full-authority digital engine controls (FADEC) or other similar device, including electronic engine control (EEC), engine control unit (ECU), electronic propeller control, propeller control unit, and the like.

The methods and systems for operating an engine described herein may be implemented in a high level procedural or object oriented programming or scripting language, or a combination thereof, to communicate with or assist in the operation of a computer system, for example the computing device 400. Alternatively, the methods and systems for operating an engine may be implemented in assembly or machine language. The language may be a compiled or interpreted language. Program code for implementing the methods and systems for operating an engine may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for operating an engine may also be considered to be implemented by way of a non-transitory computer-readable storage medium having a computer program stored thereon. The computer program may comprise computer-readable instructions which cause a computer, or more specifically the processing unit 412 of the computing device 400, to operate in a specific and predefined manner to perform the functions described herein, for example those described in the method 300.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Figure 5:
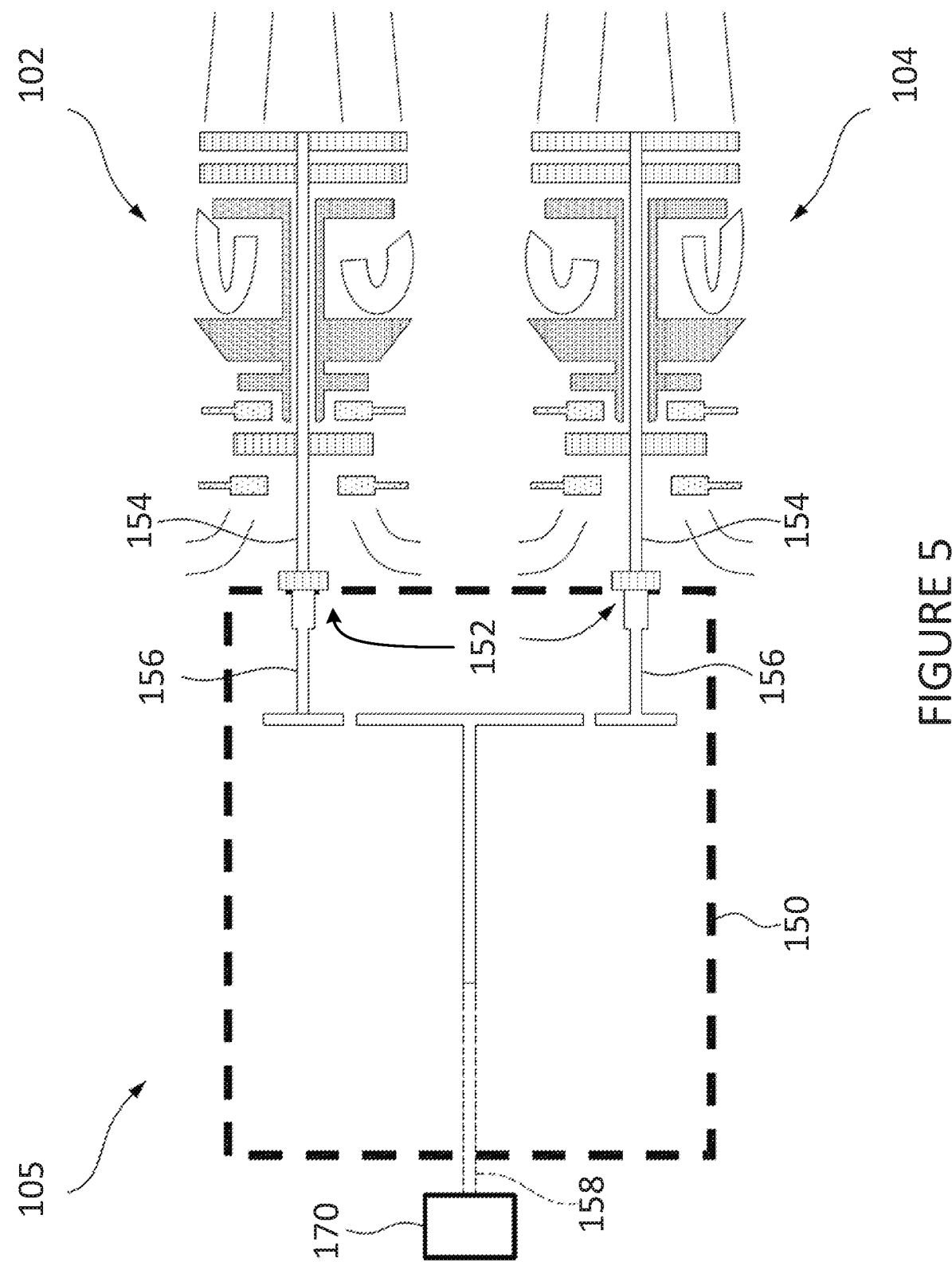
FIG. 5 is a schematic representation of an exemplary multi-engine system for an aircraft, showing axial cross-sectional views of two gas turbine engines, in accordance with one or more embodiments.

In some embodiments, the methods and/or systems described herein may be used in a multi-engine aircraft. FIG. 5 illustrates a schematic representation of an exemplary multi-engine system 105 that may be used as a powerplant for an aircraft. The multi-engine system 105 comprises two or more gas turbine engines 102, 104. Each of the gas turbine engines 102, 104 may be a turboshaft engine, such as the engine 10 of FIG. 1. The multi-engine system 105 may manage the operation of the engines 102, 104. The multi-engine system 105 may be used as a dual engine powerplant for an aircraft, such as a helicopter or other rotorcraft. In addition to airborne applications, the multi-engine system 105 may be used in marine and/or industrial applications. It should be noted that the multi-engine system 105 can include any suitable number of engines.

More particularly, the multi-engine system 105 of this embodiment includes first and second engines 102, 104 each having a respective transmission 152 which are interconnected by a common output gearbox 150 to drive a common load 170. In one embodiment, the common load 170 may comprise a rotary wing of a rotary-wing aircraft. For example, the common load 170 may be a main rotor of a rotorcraft. Depending on the type of the common load 170 and on the operating speed thereof, each of engines 102, 104 may be drivingly coupled to the common load 170 via the output gearbox 150, which may be of the speed-reduction type.

For example, the gearbox 150 may have a plurality of transmission shafts 156 to receive mechanical energy from respective output shafts 154 of respective engines 102, 104. The gearbox 150 may be configured to direct at least some of the combined mechanical energy from the plurality of the engines 102, 104 toward a common output shaft 158 for driving the common load 170 at a suitable operating (e.g., rotational) speed. It is understood that the multi-engine system 105 may also be configured, for example, to drive accessories and/or other elements of an associated aircraft. The gearbox 150 may be configured to permit the common load 170 to be driven by either of the engines 102, 104 or, by a combination of both engines 102, 104 together.

Each output shaft 154 is independently engaged or disengaged from the gearbox 150. A given transmission 152 can selectively couple or decouple a given output shaft 154 to/from the transmission shaft 156. When one or both of the output shafts 154 are engaged with the gearbox 150, the output shafts that are engaged with the gearbox 150 drive the rotor 170. When a given output shaft 154 is disengaged from the gearbox 150, rotation of that output shaft does not drive the rotor 170. When the rotor 170 rotates faster than a given output shaft 154, that output shaft becomes decoupled from the gearbox 150.

The multi-engine system 250 may be implemented according to the systems and/or methods described in U.S. Provisional Application Nos. 62/715,917, 62/803,064 and 62/803,070, and U.S. application Ser. No. 16/366,293, the contents of which are hereby incorporated by reference.

In some embodiments, the rotor 170 is driven by the first engine 102 without the second engine 104 driving the rotor 170. When the second engine 104 is not driving the rotor 170, the second engine 104 is decoupled from the rotor 170. That is, the output shaft 154 of the second engine 104 is decoupled from the gearbox 150. When the second engine 104 is decoupled from the rotor 108, the second engine 104 could be operated at low power. For example, the second engine 104 may be operated at a very low idle condition. The second engine 104 is operating at low power by supplying fuel to the first set of fuel nozzles 201 and without any fuel being supplied to at least the second set of fuel nozzles 202. In some embodiments, the amount of fuel is determined to prevent the engine 104 from being recoupled to the rotor 170. In some embodiments, one or more of the amount of fuel 250, the first value 251, the second value 252, the duration 254, the interval 256 and the rate 258 may be determined to prevent the second engine 104 from being recoupled to the rotor 170.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems for operating an engine may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

What is claimed is:

1. A method for operating an engine, the method comprising:
   operating the engine at a first power, wherein a fuel is supplied to a combustor of the engine via at least one first manifold of the engine to a first set of nozzles and at least one second manifold of the engine to a second set of nozzles;
   operating the engine at a second power that is lower than the first power;
   while the engine is at the second power, supplying the fuel to the combustor of the engine through the first set of fuel nozzles of the at least one first manifold of the engine without supplying the fuel to the combustor through the second set of fuel nozzles of the at least one second manifold of the engine; and
   while the engine is at the second power, supplying an amount of the fuel at a constant interval to the at least one second manifold to deliver the fuel to the combustor of the engine.

2. The method of claim 1, further comprising determining the amount of fuel to at least in part fill the at least one second manifold to impede fuel coking of the second set of fuel nozzles.

3. The method of claim 2, further comprising:
   determining an amount of time for one or more components of the engine to overheat when the engine operates at the second power; and
   setting a time interval for supplying the amount of fuel to the at least one second manifold at less than the amount of time as determined.

4. The method of claim 2, further comprising determining a duration for supplying the amount of fuel to the at least one second manifold, the duration determined to fill the at least one second manifold.

5. The method of claim 2, wherein the engine is decoupled from a rotor of a rotorcraft while the engine is operating at the second power, and the amount of fuel is determined to prevent the engine from being recoupled to the rotor.

6. The method of claim 2, further comprising determining a rate for supplying the amount of fuel to the at least one second manifold to prevent the engine from surging.

7. The method of claim 2, wherein one of:
   supplying the amount of fuel to the at least one second manifold comprises increasing a fuel pressure above a cracking pressure of a hydraulic flow divider valve, the hydraulic flow divider valve operatively connected to the at least one first manifold and the at least one second manifold, the hydraulic flow divider valve diverting the amount of fuel to the at least one second manifold; and
   supplying the amount of fuel to the at least one second manifold comprises actuating a solenoid of a solenoid actuated flow divider valve, the solenoid actuated flow divider valve operatively connected to the at least one first manifold and the at least one second manifold, the solenoid when actuated causing the solenoid actuated flow divider valve to divert the amount of fuel to the at least one second manifold.

8. The method of claim 2, wherein the supplying the amount of fuel is performed at a set time interval and for a set duration.

9. A system for operating an engine, the system comprising:
- at least one processing unit; and
- at least one non-transitory computer-readable memory having stored thereon program instructions executable by the at least one processing unit for:
  - operating the engine at a first power, wherein a fuel is supplied to a combustor of the engine via at least one first manifold of the engine to a first set of nozzles and at least one second manifold of the engine to a second set of nozzles;
  - operating the engine at a second power that is lower than the first power;
  - while the engine is at the second power, supplying the fuel to the combustor of the engine through the first set of fuel nozzles of the at least one first manifold of the engine without supplying the fuel to the combustor through the second set of fuel nozzles of the at least one second manifold of the engine; and
  - while the engine is at the second power, supplying an amount of the fuel at a constant interval to the at least one second manifold to deliver the fuel to the combustor of the engine.

10. The system of claim 9, wherein the program instructions are further executable for determining the amount of fuel to at least in part fill the at least one second manifold to impede fuel coking of the second set of fuel nozzles.

11. The system of claim 10, wherein the program instructions are further executable for:
- determining an amount of time for one or more components of the engine to overheat when the engine operates at the second power; and
- setting a time interval for supplying the amount of fuel to the at least one second manifold at less than the amount of time as determined.

12. The system of claim 10, wherein the program instructions are further executable for determining a duration for supplying the amount of fuel to the at least one second manifold, the duration determined to fill the at least one second manifold.

13. The system of claim 10, wherein the engine is decoupled from a rotor of a rotorcraft while the engine is operating at the second power, and the amount of fuel is determined to prevent the engine from being recoupled to the rotor.

14. The system of claim 10, wherein the program instructions are further executable for determining a rate for supplying the amount of fuel to the at least one second manifold to prevent the engine from surging.

15. The system of claim 10, wherein one of:
- the program instructions executable for supplying the amount of fuel to the at least one second manifold comprise program instructions executable for increasing fuel pressure above a cracking pressure of a hydraulic flow divider valve, the hydraulic flow divider valve operatively connected to the at least one first manifold and the at least one second manifold, the hydraulic flow divider valve diverting the amount of fuel to the at least one second manifold; and
- the program instructions executable for supplying the amount of fuel to the at least one second manifold comprise program instructions executable for actuating a solenoid of a solenoid actuated flow divider valve, the solenoid actuated flow divider valve operatively connected to the at least one first manifold and the at least one second manifold, the solenoid when actuated causing the solenoid actuated flow divider valve to divert the amount of fuel to the at least one second manifold.

16. The system of claim 10, wherein the program instructions are further executable for supplying of the amount of fuel at a set time interval and for a set duration.

17. A computer readable medium having stored thereon program code executable by a processor for operating an engine, the program code comprising instructions for:
- operating the engine at a first power, wherein a fuel is supplied to a combustor of the engine via at least one first manifold of the engine to a first set of nozzles and at least one second manifold of the engine to a second set of nozzles;
- operating the engine at a second power that is lower than the first power;
- while the engine is at the second power, supplying the fuel to the combustor of the engine through the first set of fuel nozzles of the at least one first manifold of the engine without supplying the fuel to the combustor through the second set of fuel nozzles of the at least one second manifold of the engine; and
- while the engine is at the second power, supplying an amount of the fuel at a constant interval to the at least one second manifold to deliver the fuel to the combustor of the engine.

18. The computer readable medium of claim 17, further comprising instructions for determining the amount of fuel to at least in part fill the at least one second manifold to impede fuel coking of the second set of fuel nozzles.

19. The computer readable medium of claim 18, further comprising instructions for:
- determining an amount of time for one or more components of the engine to overheat when the engine operates at the second power; and
- setting a time interval for supplying the amount of fuel to the at least one second manifold at less than the amount of time as determined.

20. The computer readable medium of claim 18, wherein the engine is decoupled from a rotor of a rotorcraft while the engine is operating at the second power, and the amount of fuel is determined to prevent the engine from being recoupled to the rotor.

* * * * *